US005160918A

United States Patent [19]

Saposnik et al.

[11] Patent Number: 5,160,918

[45] Date of Patent: Nov. 3, 1992

[54] JOYSTICK CONTROLLER EMPLOYING HALL-EFFECT SENSORS

[75] Inventors: Fabio J. Saposnik, Willowdale; Michael G. Barrette, Toronto, both of Canada

[73] Assignee: Orvitek, Inc., Ontario, Canada

[21] Appl. No.: 550,671

[22] Filed: Jul. 10, 1990

[51] Int. Cl.5 .......................... G09G 1/00; G05G 9/00; G01B 7/30; G01B 7/14

[52] U.S. Cl. ................................ 340/709; 324/207.22; 324/207.26; 324/207.23; 324/207.20; 324/207.14; 74/471 XY; 273/148 B

[58] Field of Search ....................... 324/207.20, 207.21, 324/207.22, 207.26, 207.23, 235, 251, 260-262; 74/471 XY; 273/148 B; 340/706, 709; 338/32 H

[56] References Cited

U.S. PATENT DOCUMENTS

| | | | |
|---|---|---|---|
| 4,459,578 | 7/1984 | Sava et al. | 273/148 B |
| 4,489,303 | 12/1984 | Martin | 74/471 XY |
| 4,500,867 | 2/1985 | Ishitobi et al. | 273/148 B |
| 4,520,355 | 5/1985 | Mitch | 340/709 |
| 4,639,667 | 1/1987 | Andresen | 324/207.18 |
| 4,639,668 | 1/1987 | Petit et al. | 324/208 |
| 4,646,087 | 2/1987 | Schumann | 74/471 XY |
| 4,654,647 | 3/1987 | Wedam | 340/709 |
| 4,661,773 | 4/1987 | Kawakita et al. | 324/207.22 |
| 4,733,214 | 3/1988 | Andresen | 324/207.24 X |
| 4,825,157 | 4/1989 | Mikan | 324/208 |
| 4,853,630 | 8/1989 | Houston | 324/207.20 X |

OTHER PUBLICATIONS

"Hall Effect Transducers, How To Apply Them as Sensors", 1982 by Micro Switch, Div. of Honeywell Corp.

"Application Data: Applying Linear Output Hall Effect Transducers", (date) by Micro Switch, Div. of Honeywell Corp.

*Primary Examiner*—Gerard R. Strecker
*Assistant Examiner*—Warren S. Edmonds
*Attorney, Agent, or Firm*—Lyon & Lyon

[57] ABSTRACT

A joystick controller employs differential pairs of electronic sensors to detect the direction of displacement of the joystick shaft and a single electronic sensor to detect the magnitude of the displacement. The differential pairs of sensors output signals representative of the direction of the displacement of the joystick shaft from a datum. The single sensor outputs signals having a magnitude representative of the magnitude of the displacement. A controller uses the output signals to control a dependent device. In one embodiment, the controller compares the sensor output signals to predetermined threshold values and ignores movements of the shaft which cause the sensors to generate output signals having magnitudes below the threshold values.

18 Claims, 10 Drawing Sheets

| INDICATED OUTPUT | DESIRED OUTPUT |
|---|---|
| 1 | 3·5 |
| 2 | 6·3 |
| 3 | 8.5 |
| 4 | 10.1 |
| 5 | 11.4 |
| 6 | 12.4 |
| 7 | 13.2 |
| 8 | 13.8 |
| 9 | 14.3 |
| 10 | 14.6 |

JOYSTICK CONTROLLER EMPLOYING HALL-EFFECT SENSORS

The present invention relates to joystick controllers.

Joysticks are well known input devices for controlling many types of systems ranging from cranes to robotic manipulators. There are two principal types of joystick commonly used, namely the proportional joystick and the ON/OFF joystick.

As is known to those of skill in the art, conventional proportional joysticks provide output signals which correspond to the magnitude of displacement of the joystick between two positions. For example, if a proportional joystick is connected to an engine throttle, a slight movement of the joystick will partially open the throttle. Displacement of the joystick to its extreme position will fully open the throttle.

In contrast, ON/OFF joysticks only provide an output indicating that a displacement of the joystick has occurred. For example, if an ON/OFF joystick is connected to a transmission, moving the joystick from its centered position will select a gear and returning the joystick to its centered position will disengage the gear to return the transmission to neutral.

In some systems, such as the two examples above, the joystick may be directly connected to its dependent control device so that moving the joystick directly actuates the dependent control device through mechanical linkages. While systems of this type are simple in concept, they often suffer from disadvantages.

Direct connection of the joystick to its dependent control device requires that either the dependent control device be directly attached to the joystick or that a control linkage be provided between the joystick and each control device. These linkages may be mechanical, hydraulic, pneumatic, or the like and thus it may be difficult or expensive to implement the linkages. Examples of these systems may include those which have high pressure hydraulic systems requiring long runs of expensive pressure lines or systems in which relative movement occurs between the joystick and the dependent control devices due to rotation of the operator's booth.

To overcome the problems associated with direct linkages, electronic joysticks have been used. In an electronic joystick, sensors are typically employed to detect displacement of the joystick. In operation, the sensors generate electric signals upon movement of the joystick which are used to activate the dependent control device. These dependent control devices may be solenoid activated valves, relays, electric motors, etc. The generation of electrical signals as control signals allows relatively simple and inexpensive electrical wiring to be used as a connection between the joystick and the dependent control devices.

Although conventional electronic joysticks have alleviated some of the problems associated with their mechanical counter-parts, they have however, suffered from problems as well. Various types of sensors and transducers including microswitches, potentiometers and the like have been previously employed to detect the displacement of the joystick. Unfortunately, these types of sensors tend to be delicate and may break or loose accuracy with extended or harsh use. These types of sensors are also typically susceptible to damage from any intrusion of dirt or water within the joystick housing as may occur when the joystick is used in harsh environments.

Conventional joysticks for use in devices operated in harsh environments have also typically used complex and expensive arrangements to bias the joystick so that it reverts to a centered position when not being operated. This, of course, increases the cost of the joystick.

To provide a more rugged electronic joystick, attempts have been made to use magnetic devices as sensor elements. Such a device is shown in U.S. Pat. No. 4,639,668, which employs pairs of inductors in a tuned resonant circuit. The circuit's frequency response is varied by the movement of a ferromagnetic mass which is affixed to a joystick. Displacement of the joystick is thus detected from the variations in the circuit's frequency response and appropriate control signals are produced.

Another magnetic device which has been used as a sensor element in joysticks is the Hall Effect sensor. In an application note entitled, "Hall Effect Transducers. How to apply them as sensors," published by MICRO-SWITCH, a Honeywell Division, a joystick which employs Hall Effect sensors is shown on page 145.

While resonant circuits, Hall Effect sensors and the like permit the building of a robust joystick, they too suffer from disadvantages. A primary difficulty is experienced when attempting to assure that a reasonable strength of magnetic field is present at the sensor over the entire range of joystick displacement. Magnetic field strength is inversely proportional to the square of the distance from the magnet and this may lead to undetectable field strengths being present at a sensor element when the joystick is displaced to its extreme position. Also, magnetic sensors typically suffer from saturation effects when subjected to high magnetic field levels and therefore a sensor may not be able to discriminate small displacements of the joystick about a position where the sensor is in the presence of a high strength magnetic field.

The conventional magnetic sensors described above also suffer further disadvantages. For example, tuned resonant circuits are relatively expensive to manufacture and are subject to accuracy variations with temperature changes and errors due to electronic noise. Hall Effect sensors, on the other hand, suffer variations in the sensitivity of individual sensors due to manufacturing tolerances. This has required that joysticks using Hall Effect sensors be calibrated when assembled, again increasing costs.

It is therefore an object of the present invention to provide a novel joystick which obviates or mitigates the above disadvantages.

According to one aspect of the present invention there is provided a joystick device comprising:

a shaft;

a support surface;

mounting means operating between said shaft and said support surface to allow pivotal displacement therebetween;

biasing means for biasing said shaft to a centered position;

indicator means located on said shaft adjacent one end thereof;

an array of sensor elements including at least one pair of sensor elements operating as a differential pair to detect the direction of displacement of said indicator means upon pivoting of said shaft; and a single sensor to detect the magnitude of displacement of said indicator means.

In another aspect of the present invention, there is provided a joystick device comprising:

a shaft;

a support surface;

mounting means acting between said shaft and said support surface to allow translational and rotational movement therebetween;

a spring, extending between one end of said shaft and said support surface, said spring acting to center said shaft translationally and rotationally.

Preferably, the sensor elements are arranged in an array to provide accurate readings of the joystick position over a wide range of displacement of the shaft and to eliminate the need for calibration of the joystick.

It is also preferred that the mounting means is robust, yet relatively inexpensive, and allows three degrees of freedom of movement of the joystick. Preferably, the biasing means is in the form of a single spring that operates to center the joystick.

It is also preferred that sensor elements are provided for detecting rotational movement of the shaft and for indicating the direction of rotation of the joystick.

As well, the preferred embodiment includes a microcomputer based controller which provides several advantageous features in operating the joystick including:

the capability to operate the joystick as a proportional or ON/OFF device;

the capability to provide a non-linear output signal from the joystick;

the capability to maintain a joystick output signal, when desired by the operator, even after the joystick movement has ended;

the capability to compare detected joystick displacements to preset displacement ranges stored in the controller and to disregard spurious or erroneous signals; and the capability to filter detected movements to enable spurious or erroneous signals to be disregarded.

A preferred embodiment of the present invention will now be described, by way of example only, with reference to the attached drawings wherein.

Figure 1:
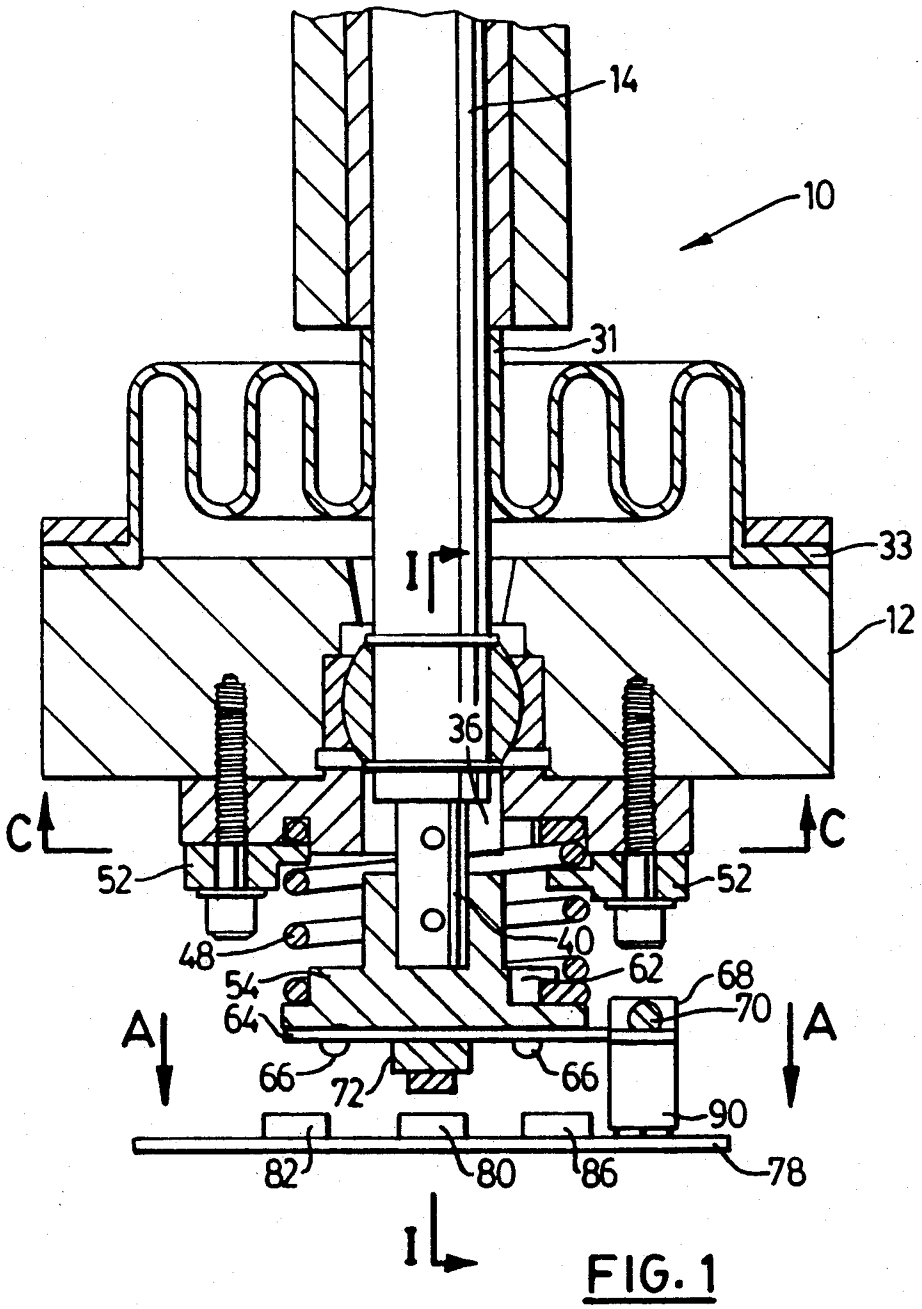
FIG. 1 shows a section of a joystick.

Referring to FIGS. 1 through 6, a joystick 10 is generally shown. The joystick 10 includes a bearing housing 12 with a stepped bore 18 provided through it. A spherical bearing 16 (Canadian Bearing Supply's NRR-10 for example) is fitted into the stepped bore 18 and is maintained in place by circlip 20. A shaft 14 passes through bearing 16 and is maintained in place by a pair of longitudinally spaced circlips 22. Bearing 16 allows a range of universal movement of the shaft 14 relative to the bearing housing 12

One end 24 of the shaft 14 extends upwardly from an upper surface of the bearing housing 12. A flexible bellows 30 rests upon the upper surface of the bearing housing 12. A sealing ring 32 is located atop the bellows 30 adjacent its outer radial edge 33. Screws, not shown, pass through the sealing ring 32 and the outer radial edge 33 into the bearing housing 12 to secure the outer radial edge 33 of the bellows 30 to the bearing housing 12. The shaft end 24 projects through a passage 31 formed through the bellows 30 with the inner radial edge of bellows 30 defining the passage 31 being sized to engage the shaft 14 sealably. A handgrip 28, having an inner sizing sleeve 26, surrounds the shaft end 24 above the bellows 30 to facilitate gripping and pivotal movement of the shaft by a user.

Figure 3:
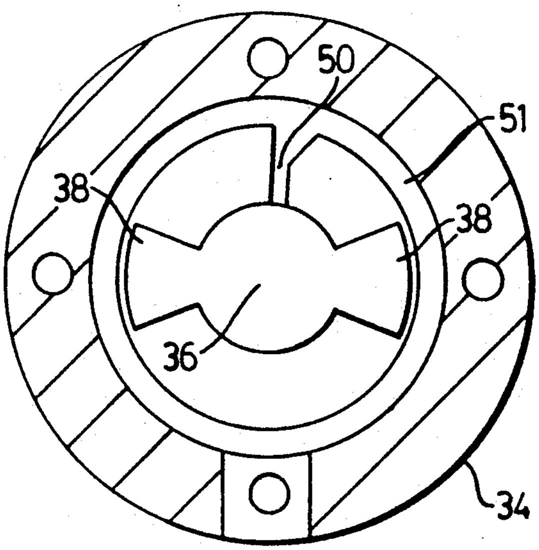
FIG. 3 shows a sectional view taken along line CC in FIG. 1.

A stop plate 34, best shown in FIG. 3, is mounted on a lower surface of bearing housing 12 by screws 42. The stop plate 34 has a central bore 36 with two eccentric lobes 38 provided therethrough. The lower end 40 of shaft 14 passes through the central bore 36 to extend beneath the bearing housing 12. A dowel pin 44 is fitted through a bore 46 in shaft 14 adjacent the stop plate 34. The dowel pin 44 is located within the passages formed through the stop plate and abuts against the walls of eccentric lobes 38 when the shaft is rotated to limit rotation of shaft 14 to a predefined range. In the preferred embodiment, the eccentric lobes 38 are sized to allow the shaft 14 to be rotated a total of approximately 45 degrees.

A helical spring 48 passes about the shaft end 40 beneath the stop plate 34. Each end of the spring 48 terminates in an arm which extends inwardly towards the longitudinal axis of the spring 48 at right angles thereto. The undersurface of the stop plate 34 has a slot 50 and an annular shoulder 51 formed therein. The shoulder 51 receives the upper portion of the spring while the slot 50 receives the arm. Retainers 52 fastened to the bearing housing by screws 42 retain the upper end of spring 48 in position in slot 50, and on shoulder 51.

Figure 4:
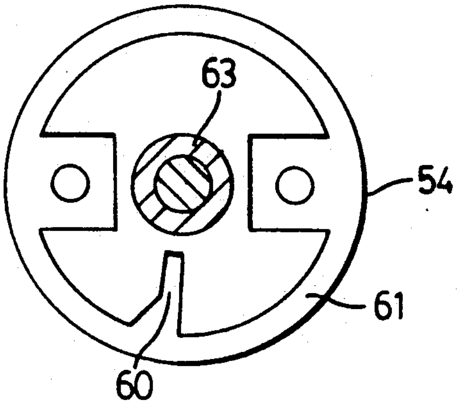
FIG. 4 shows a sectional view taken along line DD in FIG. 2.

A spring mounting plate 54, best shown in FIG. 4, is located at the lower end 40 of shaft 14. The spring mounting plate 54 has a collar 63, sized to receive the lower end 40 of the shaft. The collar 63 is maintained in place by a spring pin 56 which passes through the collar 63 and through a bore 58 in shaft 14.

The upper surface of spring mounting plate 54 has a slot 60 and a shoulder 61 similar to those provided on the undersurface of the stop plate, against which the lower end of helical spring 48 abuts while slot 60 receives the arm formed at the end of the spring 48. The lower end of the spring 48 is maintained in position with respect to the slot and shoulder by clamps 62, only one of which is shown in FIG. 1, and screws 66.

The shaft 14 is centered translationally by the spring 48 which is maintained in compression between the stop plate 34 and the spring mounting plate 54. The arms of spring 48 retained in the slots also allow the spring to center the shaft 14 rotationally. Thus, all centering requirements are met by spring 48 alone.

Figure 5:
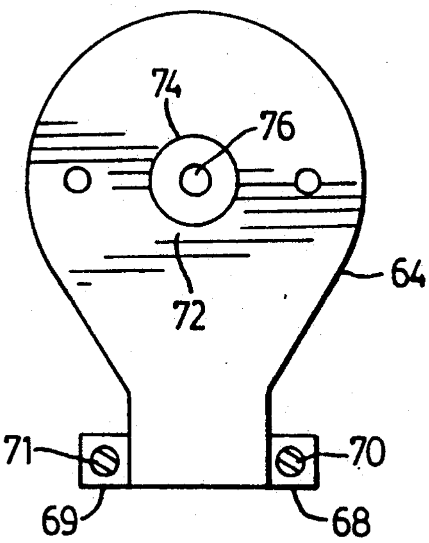
FIG. 5 shows a view in the direction of arrows B in FIG. 2.
Figure 6:
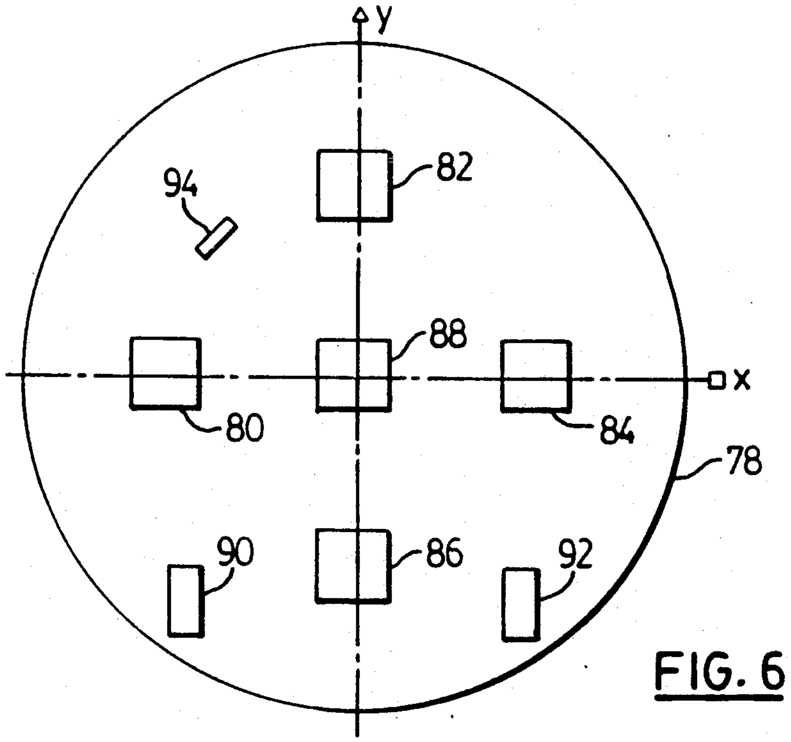
FIG. 6 shows a view in the direction of the arrows A in FIG. 1.

An indicator mount 64, best shown in FIG. 5, is secured by screws 66 to the underside of spring mounting plate 54. The indicator mount 64 is preferably formed from non-ferromagnetic material and has a pair of integrally formed wings 68,69 inclined approximately 45° to the plane of the mount 64. A magnet 70,71 is attached to each wing 68,69 respectively and a magnet assembly 72 is attached to the center of the lower side of the mount 64.

The magnet assembly 72 is formed from a first disc-shaped magnet 74 and a second, smaller diameter disc-shaped magnet 76 glued to magnet 74. The assembly 72 is glued to mount 64 such that it lies on the longitudinal axis of shaft 14 when the indicator mount 64 is fastened to the spring mounting plate 54.

Figure 2:
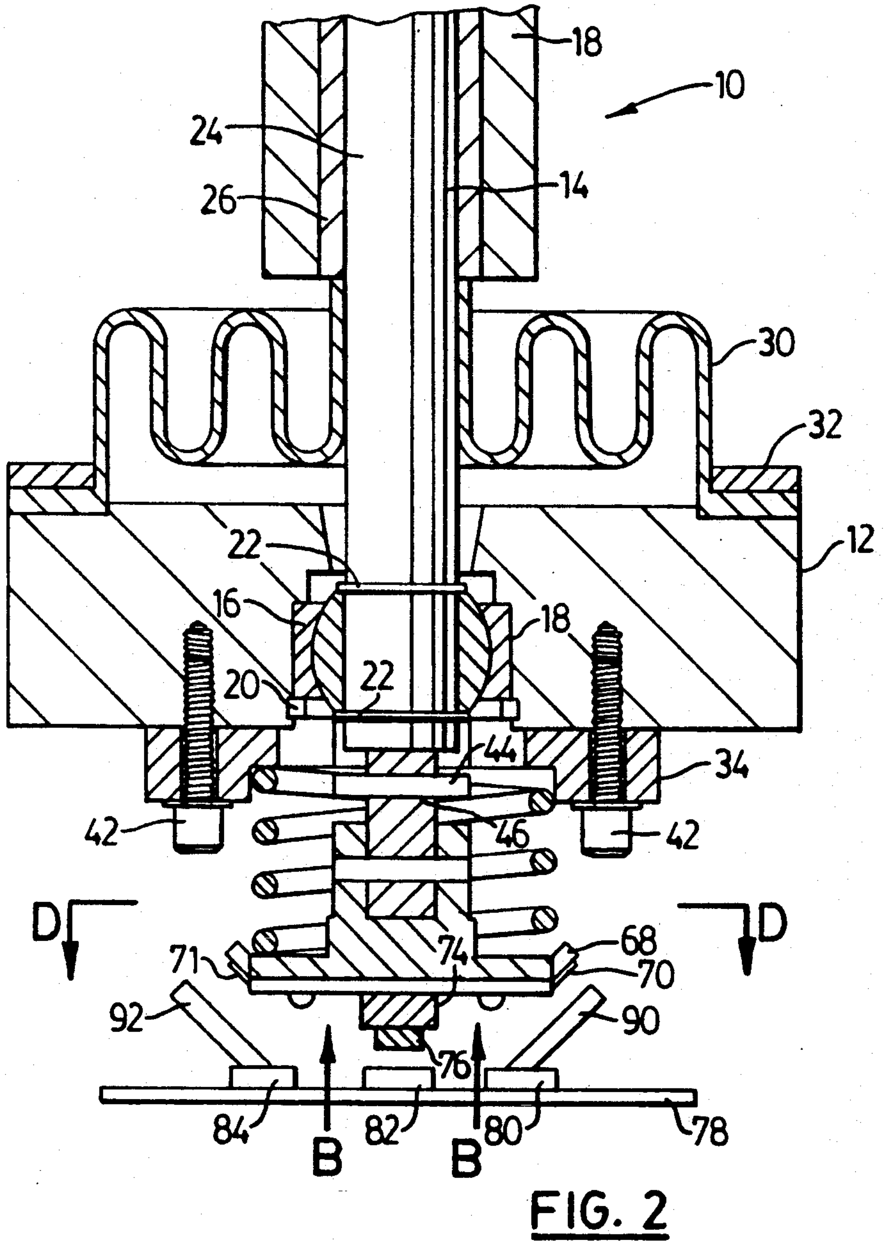
FIG. 2 shows a sectional view taken along line I—I of FIG. 1.

A mounting plate 78 is located beneath and spaced from the indicator mount 64 as shown in FIGS. 1 and 2. Four Hall-Effect sensor elements 80,82,84,86 are mounted on the plate 78 and are arranged in an array about two orthogonal axes (best seen in FIG. 6), hereinafter referred to as the X and Y axes. For the sake of clarity, sensor element 80 is hereinafter referred to as the +X sensor, sensor element 84 as the −X sensor, sensor element 82 as the −Y sensor and sensor element 86 as the +Y sensor. At the intersection point of the two axes X,Y, another sensor element 88, hereinafter referred to as the radial sensor, is mounted flat upon the mounting plate 78. In addition, at the periphery of mounting plate 78 and spaced equidistant from the axis Y, two additional Hall-Effect sensor elements 90, 92 are located.

Sensor element 90, hereinafter referred to as the counter-clockwise sensor, is mounted at a 45° angle with respect to the plane of the mounting plate 78, with the upper edge of the sensor element orientated away from axis Y. Sensor element 92, hereinafter referred to as the clockwise sensor, is also mounted at a 45° degree angle which is complementary to that of sensor element 90. A thermal sensing element or thermistor 94 may also be included on mounting plate 78 as shown.

The mounting plate 78 is positioned below indicator mount 64 in a manner such that sensor element 88 is located directly below magnet assembly 72 and such that the magnets 70,71 face sensor elements 90,92 respectively when the shaft 14 is in its centered position.

Figure 7:
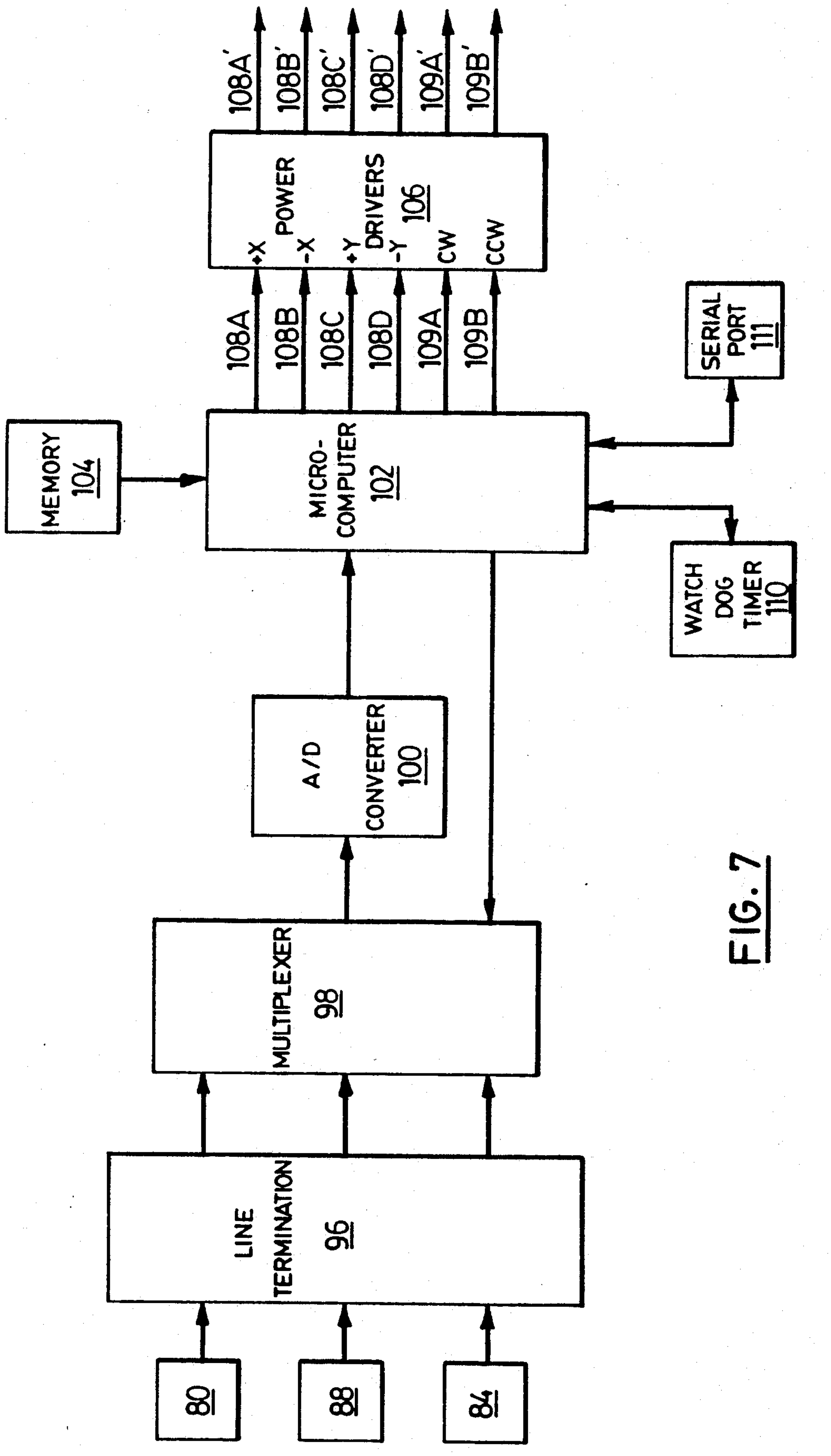
FIG. 7 is a block diagram of the microcomputer based controller.

Referring to FIG. 7, a block diagram of a joystick controller is illustrated with only three joystick sensors being shown for simplicity. As can be seen, each of the sensors 80,84,88 is connected to a line termination unit 96 which filters the output signals from the sensors to reduce high frequency electronic noise and/or transients and to provide protection from voltage spikes or surges to the other components of the system. The line termination unit 96 may be comprised of any suitable filtering circuits, such as an RLC network. The outputs of the line termination unit 96 are connected to a multiplexer 98 which is controlled by a microcomputer 102. The microcomputer is preferably in the form of a single integrated circuit or chip such as an Intel 80C31 for example. The output of the multiplexer 98 is applied to an analog to digital (A to D) converter 100. The output of the A to D convertor 100 is connected to the microcomputer 102. In this manner, the microcomputer 102 is capable of controlling the multiplexer 98 and hence data flow from the sensors to the microcomputer.

A memory device 104 (any suitable ROM or EPROM memory) is connected to microcomputer 102 and stores operating software for the joystick microcomputer 102 as well as a set of predefined threshold values which are used for comparison purposes to determine "valid" displacement of the shaft as will be described hereinafter.

The microcomputer output conductors 108,109 are connected to a power driver unit 106 which amplifies the output signals applied to conductors 108,109 to an appropriate voltage and/or current level. The amplified output signals generated by the driver unit 106 are applied to output conductors 108',109' and are suitable for connection to a control device, not shown. The power driver unit 106 may be constructed in any appropriate manner, such as amplifiers using power field effect transistors (FETs) or the like.

The microcomputer 102 is also connected to a watchdog timer 110. The timer 110 receives a signal pulse from the microcomputer 102 at a regular interval, in the preferred embodiment every ¼ second. If a pulse is not received from the microcomputer 102 when expected, the timer 110 performs a hardware reset on the microcomputer 102. In this manner, a program failure or error in the microcomputer 102 may be detected and a reset performed. A serial port 111 is also provided to allow a host computer to access the microcomputer 102. In this manner, the host computer may be used to aid in troubleshooting or debugging operations. It is also contemplated that the joystick controller could communicate directly to dependent control devices through a serial bus attached to the serial port 111.

The detection of displacement of the joystick shaft 14 will now be described with reference to the above figures and in addition to FIGS. 8,9,10.

Figure 8:
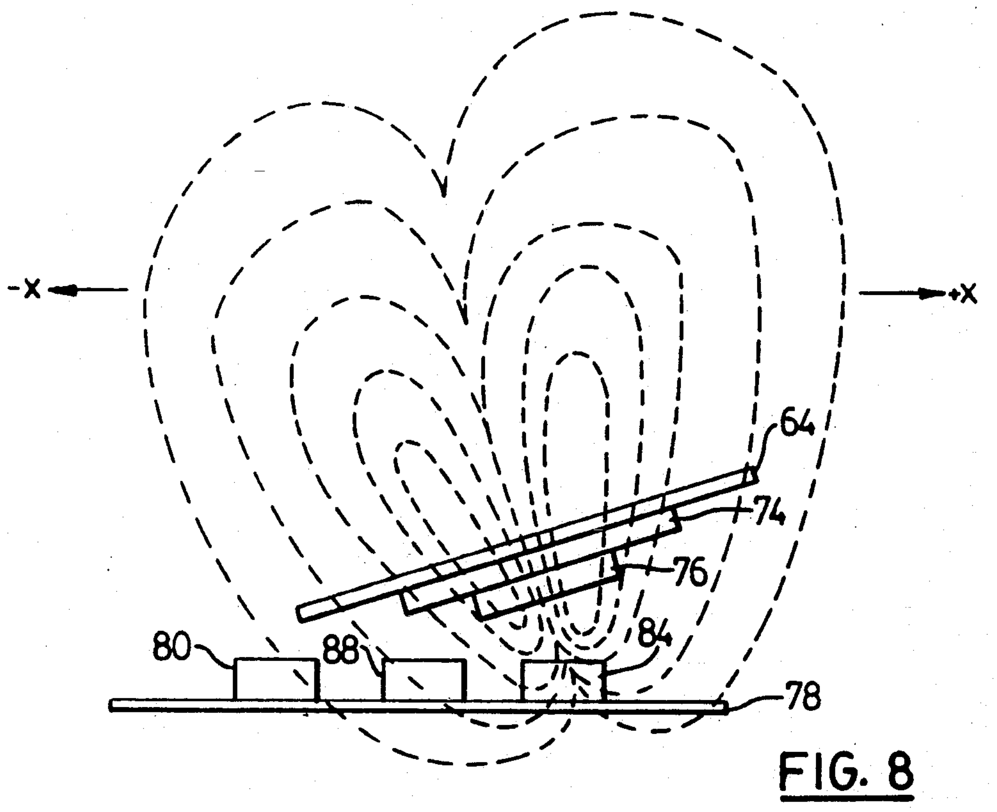
FIG. 8 shows a diagrammatic representation of the shape of the magnetic field produced by a center assembly of magnets shown in FIG. 5.

Referring now to FIG. 8, the indicator mount 64 and the mounting plate 78 are shown. The dashed isobars show the shape of the magnetic field produced by the assembly 72 of magnets 74,76. Using the reference axes of FIG. 8, when the shaft 14 of the joystick is moved in the −X direction, the indicator mount 64 is tilted with respect to the sensor mounting plate 78. This tilting reduces the magnetic field strength received at the +X sensor 80 and the radial sensor 88 and increases the field strength received at the −X sensor 84. When this occurs, the output signals generated by the sensors change. Displacement of the shaft 14 along the Y axis changes the output signals of the +Y and −Y sensors in a similar manner.

Figure 9:
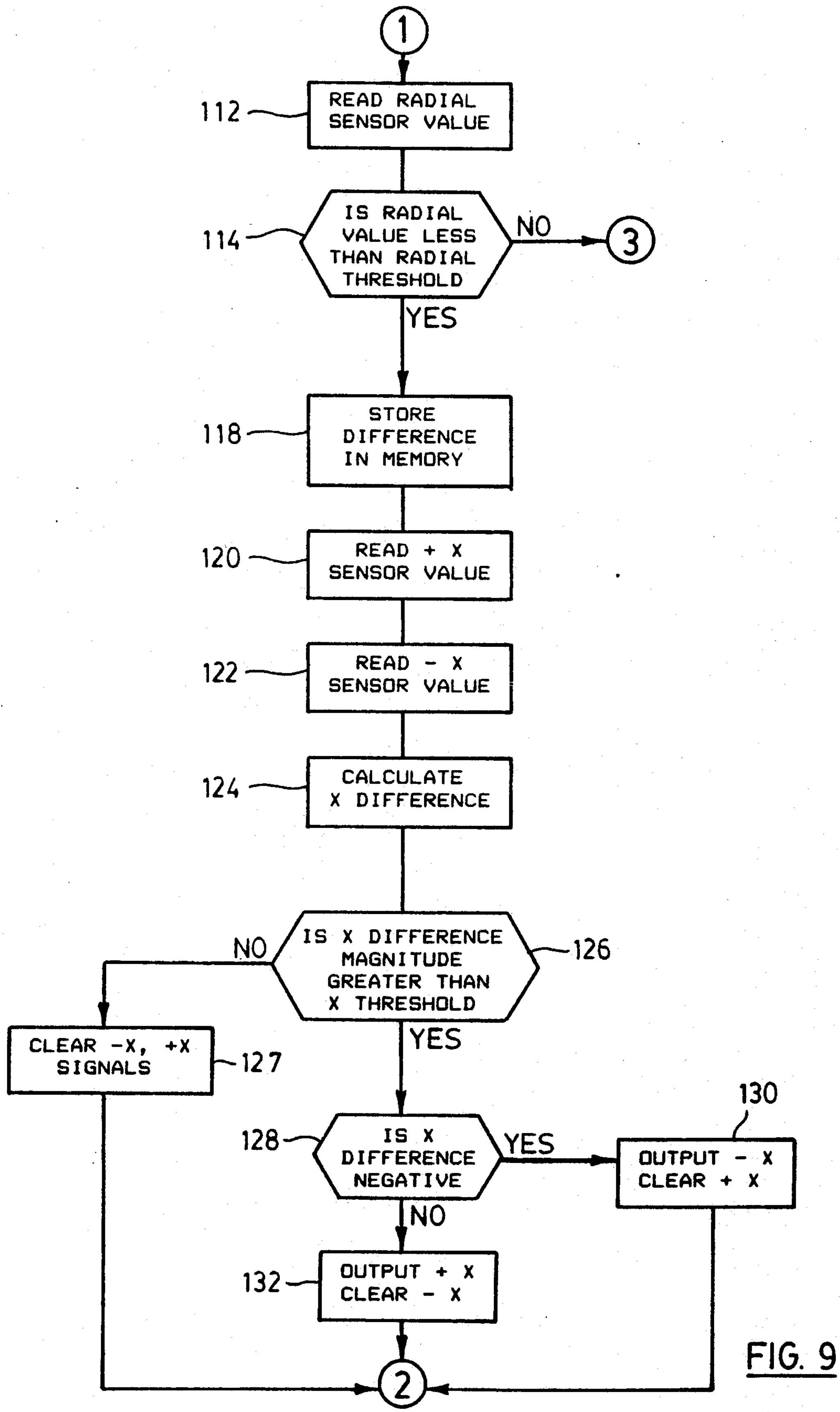
FIGS. 9,10,11 are flow charts detailing a logic flow of a microcomputer controller.
Figure 10:
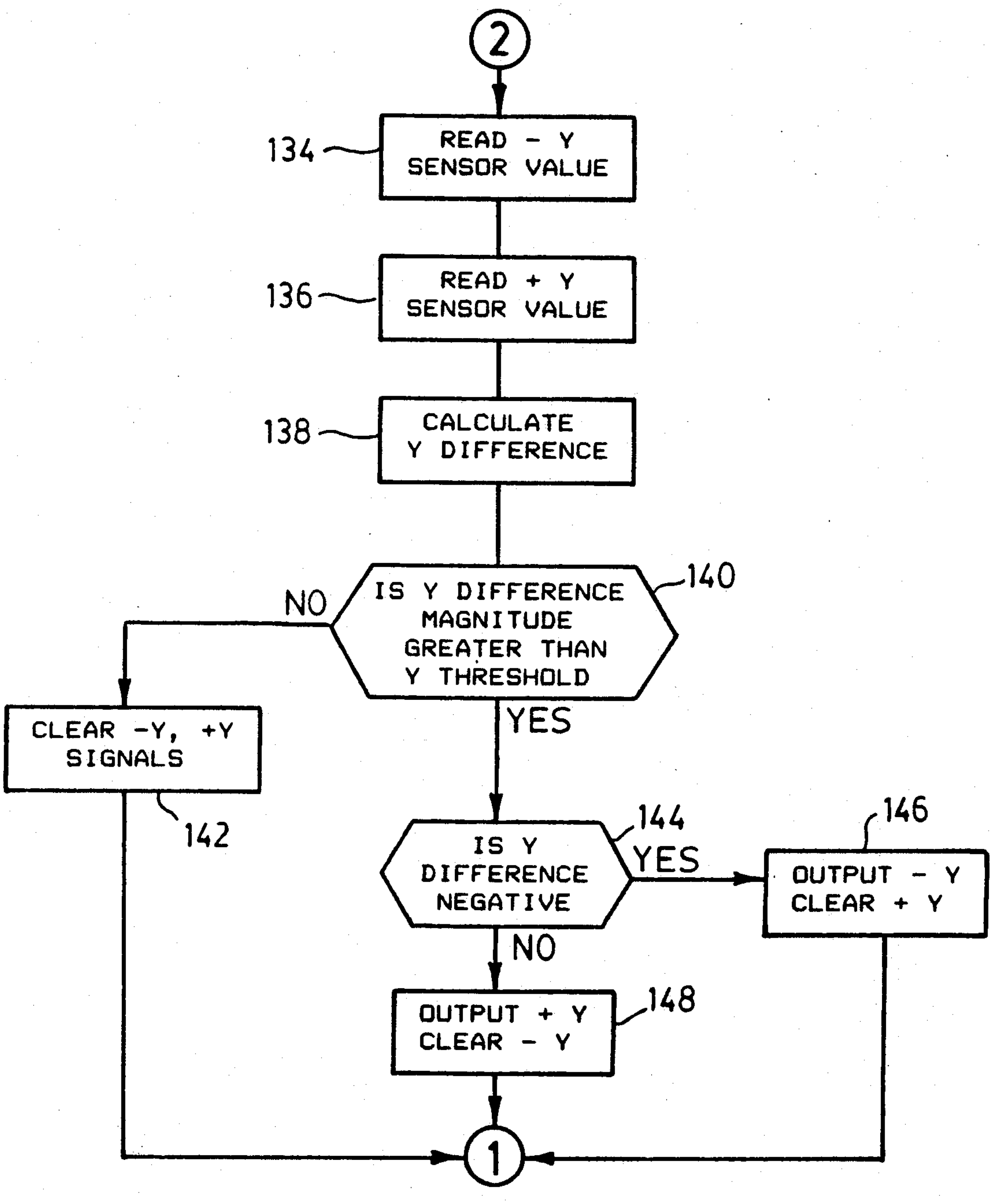
Figure 11:
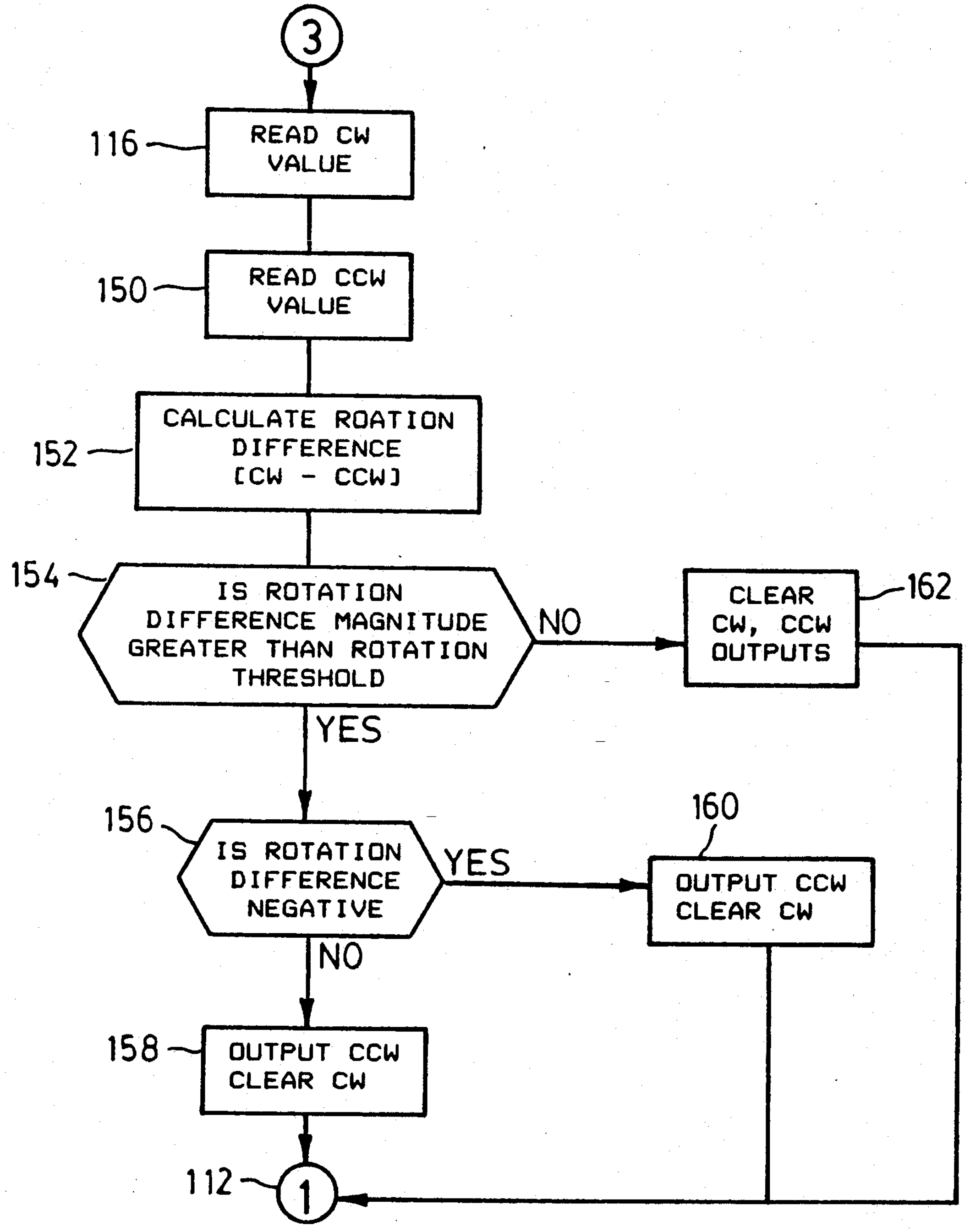

After a reset, whether a power on reset or a watchdog reset, the microcomputer 102 commences execution of the operating software stored in memory 104, a portion of the logical flow of which is shown in flow chart form in FIGS. 9, 10 and 11. The program may contain a power on self test (POST), if desired, and any other initializing routines which may be required for the particular application. When the microcomputer 102 has completed the initialization, the main operation loop starts, as indicated at step 112 in FIG. 9.

In step 112, the microcomputer 102 first reads in the digital value of the radial sensor 88. This is accomplished by controlling multiplexer 98 so that the analog signal generated by the radial sensor, is applied to the A to D converter 100 after being filtered by the termination unit 96. Once the analog signal is converted into digital form, the digital signal is received by the microcomputer 102 and stored in the registers therein. Thereafter, the stored digital value is compared to a radial threshold value stored in memory 104 which is used to determine if a valid displacement of the joystick has occurred. Depending upon the result of the comparison, the microcomputer 102 determines whether or not a valid displacement of the shaft has occurred. This allows the controller to ignore small displacements of the shaft due to operator error, mechanical vibrations, or small indicated displacements due to the various sensor element tolerances.

Each degree of freedom of the joystick has its own predefined threshold value, as does the magnitude of the displacement. Thus, in the preferred embodiment the memory 104 stores a threshold value for displacement about the X axis and Y axis, a value for the magnitude of the displacement and a value for rotation.

In step 114, if the digital value resulting from the output of the radial sensor is greater than the predefined radial threshold value, the microcomputer 102 determines that no valid translation of the shaft has occurred and the microcomputer 102 proceeds to check for rotation of the shaft at step 116 as will be described hereinafter.

If the digitized radial sensor output signal is less than the predefined radial threshold value, the microcomputer 102 stores the difference between the threshold value and the measured value in a register (step 118). This difference indicates the magnitude of the displacement of shaft 14. The microcomputer 102 then proceeds to check the differential pairs of the +X,−X and +Y,−Y sensor elements to determine the direction of the joystick displacement.

The +X,−X differential sensor pair is checked first, as follows. As indicated at step 120, the microcomputer 102 controls multiplexer 98 to connect the filtered output of +X sensor to the A to D converter 100 and thus, transfers the digitized value, when ready, into its registers.

In a similar manner, at step 122, the microcomputer 102 transfers the digital value of the −X sensor into other registers. The microcomputer 102 then calculates the difference of the two signals by subtracting the −X value from the +X value as indicated at step 124. The magnitude of this difference is compared to a predefined X threshold value (step 126) and if the difference is greater than the threshold value, the microcomputer 102 next determines the sign of the difference as indicated at step 128.

If the difference is positive, the microcomputer 102 outputs a signal indicating the magnitude of the displacement, as previously stored at step 118, on the +X conductor 108A and clears the −X conductor 108B as indicated at step 132. If the difference is negative, a signal indicating the magnitude of the displacement is output on the −X conductor 108B and the +X conductor 108A is cleared as indicated at step 130. The microcomputer 102 then performs similar operations on the signals from the +Y,−Y differential sensor pair by proceeding to step 134.

Alternately, if the magnitude of the X difference is less than the predefined X threshold value at step 126, output conductors 108A and 108B are both cleared as indicated at step 127 signifying that no X displacement of the shaft has occurred. The microcomputer 102 then proceeds to step 134 to check the +Y,−Y differential sensor pair.

The +Y,−Y differential sensor pair is checked in a manner similar to the +X,−X differential pair by controlling the multiplexer 98 to connect the +Y and −Y sensors outputs, in turn, to A to D converter 100 and then transferring the digitized values into registers in the microcomputer 102 as indicated at steps 134 and 136. At step 138, the microcomputer 102 calculates the difference between the digitized values and compares the magnitude of the difference to a predefined Y threshold value also stored in the memory 104 (step 140).

Depending upon the results of the threshold comparison at step 140, the microcomputer 102 determines whether or not there has been displacement of the shaft along the Y axis. If no displacement along the Y axis has occurred, the outputs on the +Y conductors 108C and the −Y conductors 108D are cleared by the microcomputer 102 as indicated at step 142, and the microcomputer returns to step 112.

If a displacement of the shaft has occurred in the +Y direction, as determined by a positive difference being generated after comparing the digitized values (step 144), a signal indicating the magnitude of the displacement, as stored at step 118, is output on the +Y conductor 108C by the microcomputer 102 as indicated at step 148 and the −Y conductor 108D is cleared. If the difference is negative at step 144, a signal indicating the magnitude of the displacement is output onto the −Y conductor 108D by the microcomputer 102 and +Y conductor 108C is cleared as indicated at step 146. The microcomputer 102 then proceeds to step 112.

The signals output on conductors 108 by the microcomputer 102 upon detection of shaft displacement are pulse width modulated PWM. This type of signal is well known to those of skill in the art and will only be briefly described herein. As is known t those of skill in the art, PWM signals are in the form of a continuous train of pulses with a fixed period but a variable duty cycle. The duty cycle of the pulse train is set by the microcomputer depending on the magnitudes of the detected differences. For example, if the shaft is detected as being displaced in the +X direction with the magnitude of displacement being 10% of the shaft's range of movement, the signal output to conductor 108A by the microcomputer 102 is in the form of a pulse train with fixed period wherein the pulse is 'on' for 10% of the period and 'off' for the balance of the period. If the displacement had been detected as having a magnitude of 90% of the range of movement, the pulse would be 'on' for 90% of the period and 'off' for the balance.

Once the PWM signals are applied to the conductors 108, they are fed to power drivers 106 and amplified to provide output signals on conductors 108' which have the appropriate voltage and/or current required by the control devices, not shown. As the period of the pulse train (typically in the millisecond range) is preferably much shorter than the response time of the control devices, the control devices effectively receive the average value of the PWM signal. For example, if the pulse train has a 50% duty cycle and alternates between zero and 10 volts, a connected control device would operate as if it were receiving a steady 5 volt signal. Similarly, in the case of the previous example of a 10% movement, the control device would operate as if it were receiving a 1 volt signal. Thus, the joystick in this embodiment functions in a "proportional" mode when translational movement of the shaft occurs.

While the +X and −X outputs are mutually exclusive, as are the +Y and −Y outputs, the microcomputer 102 can output the X and Y output signals at the same time. This occurs when the shaft 14 is displaced in a diagonal direction. In this case the magnitude of both output signals is the same.

If, at step 114, the digital value generated by the radial sensor is greater than the predefined radial threshold value (signifying no valid displacement of the shaft), the microcomputer 102 proceeds to check for rotation of the shaft 14 at step 116.

As mentioned previously, rotation detection of the shaft is performed by the two rotation sensor elements 90,92 and rotation indicators 70,71. When the shaft 14 is centered, the indicators 70,71 are located between, and face, their corresponding sensor elements 90,92.

When shaft 14 is rotated, in the clockwise direction, indicator 71 moves away from sensor element 92. At the same time indicator 70 moves closer to sensor element 90. Thus, the magnetic field received at sensor element 90 increases as indicator 70 moves closer to it and the magnetic field received at sensor element 92 decreases by the increased distance between it and indicator 71.

Similarly, when the shaft 14 is rotated in a counter-clockwise direction, the magnetic field received at sensor element 92 increases and the magnetic field received at sensor element 90 decreases.

The signals generated by the rotation sensor elements 90,92 are converted to digital values in a manner similar to the signals from the other sensor elements as described previously. The microcomputer 102 controls the multiplexer 98 to connect the sensor element signals to the A to D converter 100 and transfers the digitized signals into its registers. The value from the clockwise sensor is transferred as indicated at step 116 and the value from counter-clockwise sensor is transferred as indicated at step 150. The difference of the two values is determined by subtracting the value of counter-clockwise sensor from the value from clockwise sensor as indicated at step 152.

The magnitude of the difference is then compared to a predefined rotation threshold value also stored in memory 104 as indicated at step 154. If the difference is greater than the rotation threshold value, the microcomputer 102 proceeds to determine whether the difference is a positive or a negative value as indicated at step 156. If the difference is a positive value, the microcomputer provides a logic "high" output signed on the clockwise output (CW) conductor 109A and clears the counter-clockwise (CCW) conductor 109B as indicated at step 158 indicating that a clockwise rotation has occurred. If the difference between the sensor values is negative, a logic "high" output signal on the CCW conductor 109B 102 as indicated at step 160 and the CW conductor 109A is cleared. The microcomputer 102 then proceeds to step 112.

Thus, the rotation output lines 109A,109B only carry ON/OFF signals. It should be understood however, that a proportional system can be implemented if desired by modifying the control program in memory 104.

If, at step 154, the difference from step 152 is less than the rotation threshold value, the microcomputer clears, the CW conductor 109A and the CCW conductor 109B at step 162 to indicate that no rotation of the shaft has occurred and proceeds to step 112.

It should be noted that in the preferred embodiment, examination of the rotation sensor element outputs to determine rotational movement of the shaft is only performed after first determining that no translational displacement of the shaft has occurred. In this manner, indicators 70,71 are close enough to sensor elements 90,92 to provide a reasonable field strength. This might not be the case if the joystick is translated to an extreme point before being rotated. It is contemplated that rotation checking can be performed, if desired, at any point by providing additional rotational indicators and sensor elements.

The program stored in memory 104 may also be altered to provide additional features to the joystick system as required. A first additional feature for the joystick may be the provision of a latch function. A latch function maintains an output after its corresponding input has been removed. One possible implementation of the latch function would be to monitor the duration of an input signal and, if the signal was ON for at least a predetermined period of time, the output would be latched to the ON state. After the removal of the input signal, the latch function would maintain the ON output until the input was briefly reapplied or until an opposite input was applied.

Figure 12:
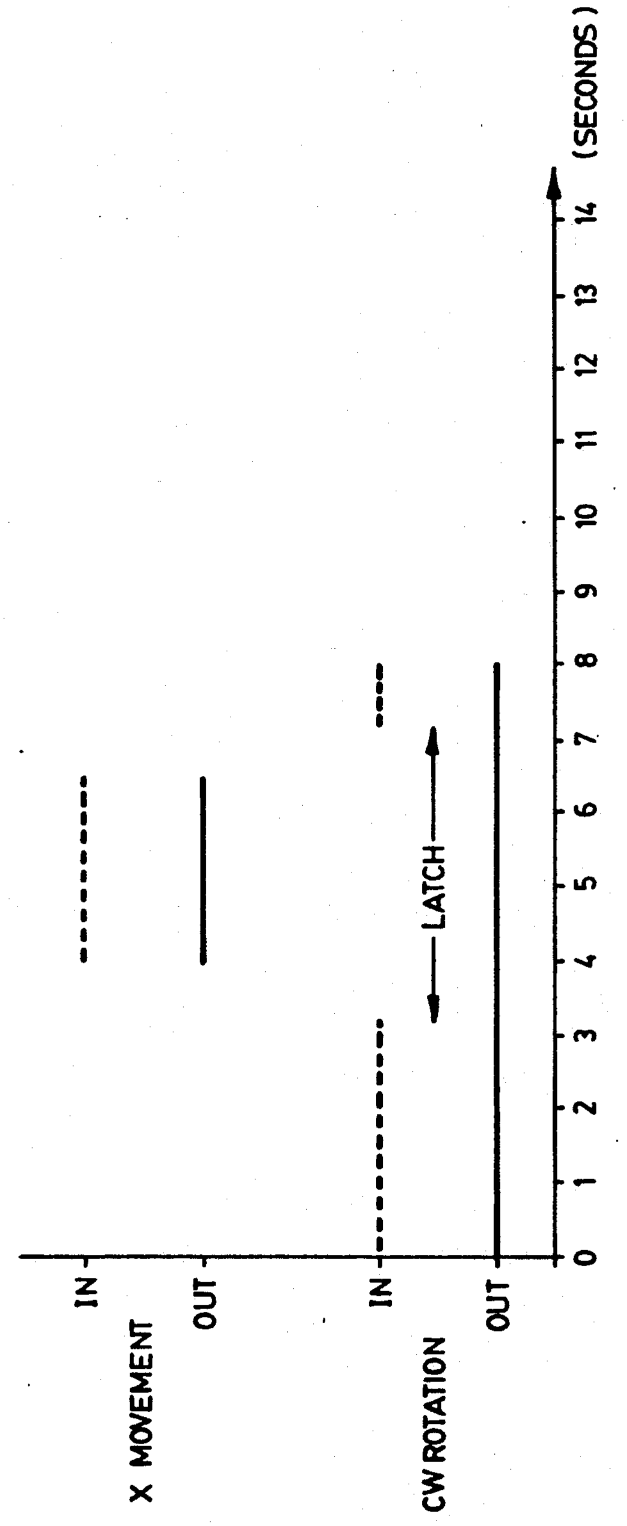
FIG. 12 is a diagrammatic representation of a latch function.

FIG. 12 shows an example of the clockwise rotation signal being latched. The clockwise input signal, shown in dashed lines, is maintained ON for the predetermined detection period, in this case four seconds. During this period the output, shown in solid line, is ON. At the four second point, the joystick is moved so that the corresponding input is OFF but the output is maintained in its ON state by the latch. The joystick operator may then, at some future time, move the shaft 14 in another direction. In this example, the operator moves the joystick in the +X direction at the five second point.

During the period between the five and eight seconds the +X input, shown in dashed lines, is ON and the +X and clockwise rotation output signals are both ON. The operator ends the +X displacement at the eight second point and centers the joystick. At the nine second point, the operator briefly rotates the shaft 14 clockwise to release the latch function and centers the joystick at the ten second point when the clockwise rotation output is switched OFF.

It is anticipated that any number of the outputs could be provided with a latch function as may be appropriate for a particular application.

A second additional feature which may be provided is that of filtering spurious signals. To avoid erroneous outputs due to spurious signals caused by vibration, operator errors, etc., the controller may perform low pass filtering on the sensor outputs. This filtering may be performed by a variety of techniques including digital filtering using well known principles of Finite Impulse Response or Infinite Impulse Response filters, or may be simply implemented as a requirement that an input signal be maintained ON for at least a minimum time period. For example, it may be decided that signal durations of less than one second are to be ignored.

Figures 13, 14:
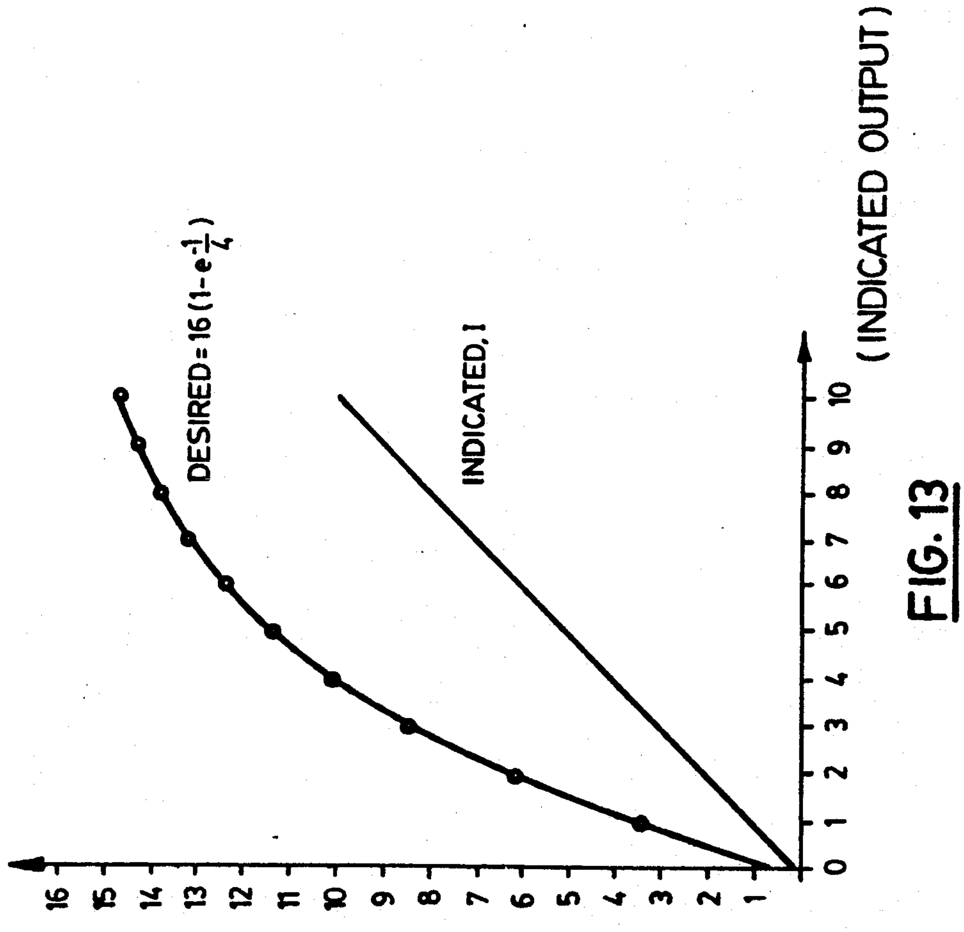
FIG. 13 is a plot comparing indicated outputs and scaled outputs.
FIG. 14 is a sample table of scaled response values corresponding to the plot shown in FIG. 13.

A third additional feature may be provided in that the magnitude of the displacement which is included in the output 108 may be scaled to provide other response profiles to the joystick when operating as a proportional device. FIG. 13 shows a plot comparing a linear output to an exponentially scaled output. It may be desired, when operating devices such as hydraulic pumps which have nonlinear performance characteristics, that the controller scale the magnitude component of its output to allow the operator to obtain a linear correspondence between the joystick inputs and the pump output. The scaling function may be provided by arithmetically scaling the magnitude signal by some predetermined mathematical function or by consulting a lookup table which may be stored in memory 104. A sample table, corresponding to the plot in FIG. 13 is shown in FIG. 14. In actual use, the values of FIG. 14 may be truncated or rounded to integer values.

To perform a lookup, the microcomputer calculates an INDICATED RADIUS output in the above-described manner and then consults memory 104 to find the corresponding DESIRED OUTPUT. The DESIRED OUTPUT is then supplied as the magnitude component of the output 108. It should be understood that the scaling is not limited to linearizing system response, virtually any response may be provided by proper selection of the scaling function or of the values in the lookup table.

A fourth additional feature may be provided in that a thermistor 94 may provide a further signal to the microcomputer, again through multiplexer 98, indicating the temperature of the sensor elements. Thus, the controller may correct any errors in the sensor element signals due to temperature variations by scaling the readings in a manner similar to that discussed above. This temperature compensation may be particularly useful in applications requiring a high degree of accuracy.

Although the joystick has been described as functioning in a proportional mode during translational movement of the shaft, it should be apparent that the joystick may be operated as an ON/OFF device. To achieve this, output signals provided on conductors 108 would not be PWM signals but instead would be one of two different voltage levels, one representing an OFF signal and the other an ON signal. It should be understood that to change from a proportional device to an ON/OFF device would only require that the program stored in memory 104 be changed so that microcomputer 102 does not provide PWM outputs.

Thus, the present invention provides advantages in that a relatively simple displacement and rotational detection scheme implementing Hall Effect sensors is used to determine universal movement of the joystick handle. Moreover, the use of a single spacing to center the joystick handle translationally and rotationally reduces components while providing a robust and inexpensive centering mechanism.

It is to be understood that any combination of the above features may be included as required. It is to be further understood that modification of the controller, to include the above features or to change a scaling operation if provided, may be implemented by changing the contents of the memory 104.

We claim:

1. A joystick device comprising:

a shaft;

a support surface spaced from one end of said shaft;

mounting means acting between said shaft and said support surface to allow pivotal displacement therebetween, said mounting means further allowing said shaft to be rotated about the longitudinal axis of said shaft;

first and second pairs of sensors on said support surface operating as differential pairs, said first pair of sensors being arranged along a first axis and said second pair of sensors being arranged along a second axis orthogonal to said first axis;

a single sensor on said support surface generally centrally located relative to said first and second pairs of sensors;

a pair of spaced, rotational sensors on said support surface;

at least one element on said shaft adjacent said one end thereof, said at least one element being movable over said support surface upon movement of said shaft, movement of at least one element being detected by said first and second pairs of sensors, said single sensor and said rotational sensors, said first and second pairs of sensors detecting the direct of displacement of said at least one element upon pivoting of said shaft from a datum and said single sensor detecting the magnitude of said displacement, said rotational sensors detecting the direction of rotation of said at least one element upon rotation of said shaft; and control means receiving sensor output signals from said first and second pairs of sensors, said signal sensor and said rotational sensor corresponding to movement of said at least one element and outputting control signals representing the direction of movement of said at least one element to a dependent device to be controlled.

2. A joystick device according to claim 1 wherein said control signals further indicate the magnitude of said movement.

3. A joystick device according to claim 2 wherein said control means maintains a control signal indicating the direction and magnitude of a movement of said at least one element after said element at least one element has been returned to said datum.

4. A joystick device according to claim 2 wherein said control signals indicative of displacement of said at least one element are configured to a greater or lesser displacement through at least one portion of the range of movement of said at least one element.

5. A joystick device according to claim 2 further including biasing means to return said shaft to said datum after said shaft has been moved.

6. A joystick device according to claim 5 wherein said biasing means is in the form of a single spring acting between said shaft and said support surface.

7. A joystick device according to claim 1 wherein said control means includes memory means storing threshold displacement values, said control means comparing the magnitude of said sensor output signals with said threshold displacement values to determine whether a valid displacement of said at least one element has occurred, said control means providing said control signals upon detection of a valid displacement of said at least one element.

8. A joystick device according to claim 7 wherein said control means further includes filtering means operable upon said sensor output signals to remove spurious signals therein.

9. A joystick device according to claim 1 further including biasing means to return said shaft to said datum after said shaft has been moved.

10. A joystick device according to claim 9 wherein said biasing means is in the form of a single spring acting between said shaft and said support surface.

11. A joystick device according to claim 9 wherein said control means further includes filtering means operable upon said sensor output signals to minimize or remove spurious signals therein.

12. A joystick device according to claim 9 wherein said control means only monitors the output of said rotational sensors when a valid displacement of said at least one element has not been detected.

13. A joystick device according to claim 1 wherein said control means maintains a control signal indicating the direction of movement of said at least one element after said at least one element has been returned to said datum.

14. A joystick device comprising:

a shaft;

a support surface spaced from one end of said shaft;

mounting means including a spherical bearing acting between said shaft and said support surface to permit pivotal movement of said shaft relative to said support surface and rotational movement of said shaft about the longitudinal axis thereof;

abutment means on said support surface to limit said rotational movement on said shaft;

first and second pairs of sensors on said support surface operating as differential pairs, and first pair of sensors being arranged along a first axis and said second pair of sensors being arranged along a second axis substantially orthogonal to said first axis;

a single sensor on said support surface generally centrally located relative to said first and second pairs of sensors;

a pair of spaced, rotational sensors on said support surface; and at least one element in the form of a magnet assembly mounted on said one end of said shaft, said magnet assembly being movable over said support surface upon movement of said shaft, movement of said magnet assembly being detected by said first and second pairs of sensors, said single sensor and said rotational sensors, said first and second paris of sensors detecting the direction of displacement of said magnet assembly upon pivoting of said shaft from a datum and said single sensor detecting the magnitude of said displacement, said rotational sensors detecting the direction of rotation of said magnet assembly upon rotation of said shaft.

15. A joystick device as defined in claim 14 wherein said at least one element includes a pair of magnets, one of said magnets being spaced from said magnet assembly, said rotational sensors monitoring movement of said pair of magnets.

16. A joystick device according to claim 15 wherein said pair of magnets and said rotational sensors are inclined at an angle with respect to a plane normal to the longitudinal axis of said shaft.

17. A joystick device according to claim 16 wherein said magnets and magnet assembly are mounted on a first plate carried by said shaft and said first and second pairs of sensors, said single sensor and said rotational sensors are mounted on a second plate spaced from said first plate.

18. A joystick device according to claim 14 further including control means receiving sensor output signals from said first and second pairs of sensors, said single sensor and said rotational sensors corresponding to movement of said magnet assembly and outputting control signals representing the direction of movement of said magnet assembly to a dependant device to be controlled.

* * * * *